_(12)_ United States Patent
Domokos et al.

(10) Patent No.: US 7,749,937 B2
(45) Date of Patent: *Jul. 6, 2010

(54) CATALYST COMPOSITION, ITS PREPARATION AND USE

(75) Inventors: Laszlo Domokos, Amsterdam (NL); Hermanus Jongkind, Amsterdam (NL); Willem Hartman Jurriaan Stork, Amsterdam (NL); Johanna Maria Helena Van Den Tol-Kershof, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/476,855

(22) Filed: Jun. 2, 2009

(65) Prior Publication Data

US 2009/0239743 A1 Sep. 24, 2009

Related U.S. Application Data

(62) Division of application No. 10/783,130, filed on Feb. 20, 2004, now Pat. No. 7,557,062.

(30) Foreign Application Priority Data

| Feb. 24, 2003 | (EP) | ................................. 03251094 |
| Jul. 8, 2003 | (EP) | ................................. 03291691 |
| Feb. 6, 2004 | (EP) | ................................. 04250635 |

(51) Int. Cl.
*B01J 23/00* (2006.01)
*B01J 21/00* (2006.01)
*B01J 20/00* (2006.01)
*B01J 29/00* (2006.01)
*B01J 27/00* (2006.01)
*B01J 37/00* (2006.01)

(52) U.S. Cl. ..................... 502/309; 502/104; 502/242; 502/257; 502/258; 502/259; 502/260; 502/314; 502/315; 502/316; 502/320; 502/322; 502/323; 502/327; 502/332; 502/335; 502/336; 502/337; 502/338; 502/350; 502/351; 502/355; 502/415; 502/439

(58) Field of Classification Search ................ 502/104, 502/242, 257, 258, 259, 260, 309, 314, 315, 502/316, 320, 322, 323, 327, 332, 335, 336, 502/337, 338, 350, 351, 355, 415, 439
See application file for complete search history.

(56) References Cited

U.S. PATENT DOCUMENTS

| 2,554,282 | A | | 5/1951 | Voorhies, Jr. ................ 196/78 |
| 3,016,647 | A | | 1/1962 | Peterson et al. ................. 43/3 |
| 3,232,863 | A | | 2/1966 | Watson et al. ............... 208/36 |
| 3,403,092 | A | | 9/1968 | Rausch ........................ 208/36 |
| 3,535,110 | A | * | 10/1970 | Todd ............................. 419/2 |
| 3,591,362 | A | * | 7/1971 | Benjamin .................... 428/570 |
| 3,671,201 | A | * | 6/1972 | Bergna ........................ 75/238 |
| 3,676,161 | A | * | 7/1972 | Yates ........................... 501/87 |
| 3,809,545 | A | * | 5/1974 | Benjamin .................... 75/255 |
| 3,817,873 | A | * | 6/1974 | Mickelson ................... 502/211 |
| 3,825,502 | A | | 7/1974 | Takenaka et al. ............ 252/465 |
| 3,825,504 | A | * | 7/1974 | Hifman ....................... 502/335 |
| 3,994,833 | A | * | 11/1976 | Jouy et al. .................. 502/309 |
| 4,206,036 | A | * | 6/1980 | Takeuchi et al. .............. 208/89 |
| 4,240,931 | A | * | 12/1980 | Milberger et al. ........... 502/306 |
| 4,404,097 | A | | 9/1983 | Angevine et al. ........... 208/210 |
| 4,408,067 | A | | 10/1983 | Nakamura et al. ........... 560/215 |
| 4,418,007 | A | | 11/1983 | Derrien ...................... 502/312 |
| 4,425,260 | A | | 1/1984 | Ebner ......................... 502/255 |
| 4,459,369 | A | * | 7/1984 | Passariello .................. 502/306 |
| 4,491,639 | A | | 1/1985 | Happel et al. ............... 502/219 |
| 4,655,906 | A | * | 4/1987 | Bjornson et al. ............ 208/217 |
| 4,849,392 | A | * | 7/1989 | Hums et al. ................. 502/209 |
| 4,851,381 | A | * | 7/1989 | Hums ......................... 502/209 |
| 4,925,825 | A | * | 5/1990 | Tachi et al. .................. 502/309 |
| 5,036,037 | A | * | 7/1991 | Kladnig et al. .............. 502/319 |
| 5,082,820 | A | * | 1/1992 | Mitsui et al. ................ 502/350 |
| 5,244,858 | A | | 9/1993 | Usui et al. ................... 502/220 |
| 5,403,806 | A | * | 4/1995 | Simpson ..................... 502/211 |
| 5,409,681 | A | * | 4/1995 | Kato et al. ............... 423/239.1 |
| 5,582,809 | A | * | 12/1996 | Rikimaru et al. ........ 423/239.1 |
| 5,648,311 | A | | 7/1997 | Herda et al. ................ 502/315 |
| 5,658,546 | A | * | 8/1997 | Kobayashi et al. ....... 423/239.1 |

(Continued)

FOREIGN PATENT DOCUMENTS

EP 0731156 A2 9/1996

(Continued)

OTHER PUBLICATIONS

"Hydrodesulfurization of Methyl-Substituted Dibenzothiophenes: Fundamental Study of Routes to Deep Desulfurization," by M. V. Landau, D. Berger, and M. Herskowitz, Journal of Catalysis 159, (1996) pp. 236-245.

(Continued)

*Primary Examiner*—Cam N Nguyen
(74) *Attorney, Agent, or Firm*—Charles W. Stewart

(57) ABSTRACT

An unsupported catalyst composition which comprises one or more Group VIb metals, one or more Group VIII metals, and a refractory oxide material which comprises 50 wt % or more titania, on oxide basis, which is prepared by precipitation techniques, finds use in the hydroprocessing of hydrocarbonaceous feedstocks.

18 Claims, No Drawings

U.S. PATENT DOCUMENTS

| | | | | |
|---|---|---|---|---|
| 5,945,372 | A | * | 8/1999 | Landgraf et al. ............ 502/350 |
| 6,037,300 | A | * | 3/2000 | Kasztelan et al. ........... 502/204 |
| 6,090,745 | A | | 7/2000 | DuBois et al. .............. 502/313 |
| 6,124,232 | A | | 9/2000 | Chang et al. ................ 502/308 |
| 6,162,350 | A | | 12/2000 | Soled et al. ................. 208/113 |
| 6,242,379 | B1 | * | 6/2001 | Williams et al. ........... 502/300 |
| 6,271,169 | B1 | | 8/2001 | Kourtakis et al. ........... 502/305 |
| 6,383,975 | B1 | * | 5/2002 | Rocha et al. ................ 502/309 |
| 6,444,608 | B1 | * | 9/2002 | Oki et al. .................... 502/300 |
| 6,479,428 | B1 | * | 11/2002 | Tonkovich et al. .......... 502/302 |
| 6,586,361 | B1 | * | 7/2003 | Heidemann et al. ......... 502/353 |
| 6,638,486 | B2 | * | 10/2003 | Masaki et al. ............ 423/213.2 |
| 6,638,890 | B2 | | 10/2003 | Tanimoto et al. ............ 502/300 |
| 6,716,404 | B2 | | 4/2004 | Masaki et al. ............ 423/213.2 |
| 6,780,816 | B2 | | 8/2004 | Tanimoto et al. ............ 502/300 |
| 6,870,014 | B2 | | 3/2005 | Steinbrenner et al. ......... 526/90 |
| 7,071,140 | B2 | | 7/2006 | Paparizos et al. ........... 502/215 |
| 2004/0102643 | A1 | | 5/2004 | Tway ........................ 558/325 |

FOREIGN PATENT DOCUMENTS

| | | |
|---|---|---|
| EP | 1090682 A1 | 4/2001 |
| EP | 1090683 A1 | 4/2001 |
| GB | 1178854 | 2/1967 |
| JP | 04243547 | 8/1992 |
| WO | WO0041810 | 7/2000 |
| WO | WO0042119 | 7/2000 |
| WO | WO0073402 A1 | 12/2000 |
| WO | WO2004073659 | 9/2004 |

OTHER PUBLICATIONS

International Search Report of Jul. 27, 2004.

* cited by examiner

CATALYST COMPOSITION, ITS PREPARATION AND USE

This application is a division of application Ser. No. 10/783,130, filed Feb. 20, 2004, now U.S. Pat. No. 7,557,062.

FIELD OF THE INVENTION

The present invention concerns catalyst compositions having a high metals content, their preparation and use in hydroprocessing, particularly hydrodesulphurisation and hydrodenitrogenation.

BACKGROUND OF THE INVENTION

Hydroprocessing reactions involve the application of hydrogen to a substrate, usually under elevated temperature and pressure, in the presence of a catalyst with the aim of causing a physical or chemical change in the substrate. Most such hydroprocessing reactions occur in refinery operations where the substrate is a hydrocarbon feedstock.

Conventional hydroprocessing catalysts are generally in the form of a carrier of a refractory oxide material on which hydrogenation metals are deposited, the choice and amount of each component being determined by the end use. Refractory oxide materials usual in the art are amorphous or crystalline forms of alumina, silica and combinations thereof. These oxide materials can have some intrinsic catalytic activity but often only provide the support on which active metals compounds are held. The metals are generally base or noble metals from Group VIII and Group VIB of the Periodic Table which are deposited in oxidic form during manufacture; in the case of base metals, the oxides are then sulphided prior to use to enhance their activity.

The use of titania, or titanium dioxide, as a catalyst support for a conventional hydroprocessing catalyst is limited by the lack of a useful pore structure. Therefore the few titania-supported commercial hydroprocessing catalysts that exist in the market have a low pore volume and as a result can hold or support less hydrogenation metals than the more common alumina-supported catalysts. Generally it is viewed that thermal stability, low surface area and poor mechanical strength have all hindered the commercial exploitation of titania supported catalyst systems. The intrinsic activity of hydrogenation metals-on-titania is, however, superior to eg alumina-based catalysts. The proposals available in the art attempt to harness this intrinsic activity and remedy the deficiencies of low metals loadings and thermal instability by using mixed oxides.

M. Breysse et al in Catalysis Today 86 (2003) 5-16, notes that the molybdenum loading on a typical titania supported system is generally limited to 6 wt % Mo because of the low surface area of the support but with recent improvements in preparing mesoporous titania this can be expected to increase to 10 to 12 wt %. Tests using a typical hydrogenation metal combination of nickel and molybdenum showed that a NiMo-titania catalyst had the lowest activity for tetralin conversion in the presence of $H_2S$ than NiMo on various mixed titania-alumina supports, and NiMo-alumina catalysts. Later in the same review article it is concluded that the presence of nickel or cobalt suppresses the higher intrinsic activity of molybdenum-titania systems.

G. M. Dhar et al. in Catalysis Today 86 (2003), 45-60, also looks at various mixed alumina-titania supported systems; hydrogenation metals are applied by the conventional incipient wetness impregnation method and an improved HDS and hydrogenation activity is attributed to increased metals dispersion. Here the presence of small amounts (3 wt %) of nickel and cobalt are considered to promote, eg, HDS activity of a catalyst of 8 wt % molybdenum on mixed titania-alumina supports. In a study of variation of Mo loading, the maximum molybdenum content considered is 14 wt % (as the oxide and basis total catalyst).

Also proposed in the art for hydrotreating and particularly for use in hydrodesulfurization (HDS), especially deep desulfurisation of diesel fractions, are catalyst compositions which contain refractory oxide material but which are made via co-precipitation. European Patent specification EP-A-1090682 describes one such co-precipitation proposal to prepare a hydrotreating catalyst, which catalyst has various properties including a crystalline phase, such as alpha-alumina, viewed as necessary for high activity and to impart mechanical strength and therefore a longer service life in commercial use.

By co-precipitation, the incorporation of a dispersed metals content into a conventional carrier material is attempted by enabling intimate contact between metals compounds and carrier material and thus enabling the metals to become dispersed through the carrier material before shaping. This contrasts with conventional impregnation techniques where only a small amount of metals deposition is possible since the shaped carrier is already formed and there are diffusional and space limitations for the metal ions or compounds to become dispersed through the catalyst support.

Alternative catalyst forms have been proposed for use in the hydroprocessing of, for example, refinery streams. One such group of catalysts are termed 'bulk catalysts'. Such catalysts are formed from metal compounds only, usually by co-precipitation techniques, and have no need for a catalyst carrier or support; see for example WO 00/42119, U.S. Pat. No. 6,162,350 and WO 00/41810. These publications disclose bulk Group VIII and Group VIb metal catalysts and their preparation and use. U.S. Pat. No. 6,162,350 discloses that such catalysts may contain one or more of each metal type, and examples show NiMo, NiW and the most preferred NiMoW bulk catalysts. The preference in U.S. Pat. No. 6,162,350, WO 00/42119 and WO 00/41810 is that no binder is incorporated into the final catalyst composition since the activity of the bulk catalyst composition may be reduced (U.S. Pat. No. 6,162,350, Column 14, lines 10 to 114). If, however, a binder is to be used the resulting catalyst composition comprises the bulk catalyst particles embedded in the binder with the morphology of the bulk catalyst particles essentially maintained in the resulting catalyst composition (U.S. Pat. No. 6,162,35, Col. 14, lines 24 to 30). The binder when present is preferably added prior to shaping but can be added at any stage in the catalyst preparation.

The use of titania as a refractory oxide material or binder is proposed as one of many suitable oxide materials in these patent publications, but there is no indication that its use is actually contemplated or expected to provide any benefit over the alumina- and silica-bound forms exemplified.

In refinery processes, feedstocks contain a variety of contaminants, the main ones being sulfur and nitrogen. While sulfur reduction has always been desirable, increasingly strict regulations on gas emissions eg from motor vehicles, is driving the need for catalysts which can provide ultra low sulfur fuels. For effective HDS activity, and especially for the deep desulfurisation required for environmental reasons, a catalyst must be effective to remove all sulfur compounds, whether simple or complex. Nitrogen contaminants, while often low in amount, can have a severe poisoning effect on catalysts and also adversely affect end product storage stability and quality. The poisoning effect on catalysts is such that a catalyst effective for, eg HDS, of a pure chemical feedstock may be ineffective or short-lived when exposed to an impure refinery feedstock.

Thus, there is a continuing demand for hydroprocessing catalysts for feedstocks having both sulfur and nitrogen contaminants, which catalysts have a significant hydrodesulphurisation activity for both simple and complex sulfur-containing compounds in the presence of nitrogen contaminants but even more desirably also have a high or improved hydrodenitrogenation (HDN) activity.

SUMMARY OF THE INVENTION

It has now surprisingly been found that when titania is incorporated into an unsupported or precipitated catalyst in significant amounts, the resulting catalyst composition has a substantially higher HDS and HDN activity than the use of alumina or silica alone. This is achieved with the use of nickel and cobalt as hydrogenation metals and not just molybdenum (and/or tungsten) alone. High metals contents can be sustained in the catalyst compositions of the invention; they can be processed and used in high temperature environments, and a comparable mechanical strength to conventional commercial supported hydroprocessing catalysts is found.

Accordingly the present invention provides an unsupported catalyst composition which comprises one or more Group VIb metals, one or more Group VIII metals, and a refractory oxide material which comprises 50 wt % or more titania, on oxide basis.

Also provided is a process for the preparation for the catalyst composition of the invention, and its use in hydroprocessing.

DETAILED DESCRIPTION OF THE INVENTION

This invention relates to the hydroprocessing of chemical and petroleum feedstocks using a catalyst composition containing Group VIII (especially Ni and/or Co) and Group VIB (especially Mo and/or W) metals and an inert refractory oxide, of which 50 wt % or more is titania.

Herein reference is made to the Periodic Table of Elements which appears on the inside cover of the CRC Handbook of Chemistry and Physics ('The Rubber Handbook'), 66$^{th}$ edition and using the CAS version notation.

The term 'hydroprocessing' is used herein to cover a range of hydrotreatment processes where the hydrocarbon feed is brought in contact with hydrogen in order to modify key physical and chemical properties.

The catalyst composition of the present invention is an unsupported catalyst composition comprising at least one Group VIII metal, at least one Group VIb metal and a refractory oxide material of which at least 50 wt % is titania.

By the term 'unsupported' it is to be understood that the composition is not of the conventional form which has a preformed, shaped catalyst support which is then loaded with metals via impregnation or deposition, but is a composition in which the metals and refractory oxide material are combined together when the composition is formed prior to any shaping step. Generally this combination will occur through precipitation. Unlike supported catalysts, in this unsupported catalyst composition, the refractory oxide material is no longer a separate distinct material within the composition. However, the presence of titanium can in most cases be identified from an XRD powder diffraction analysis, and it is also possible to determine the components of the composition and the proportion of the composition that is derived from the titania-containing refractory oxide material by analytical techniques common in the art, such as XRF (X-Ray Fluoresence) and ICP (Inductively-Coupled Plasma Spectrometry Analysis).

The titania is present as 50 wt % or more of the refractory oxide material. Preferably it is present in an amount in the range of from 70 to 100 wt %, especially in the range of from 90 to 100 wt %. It is especially present in an amount in the range of from 95 to 100 wt %. It is especially preferred that titania is the predominant and particularly the sole component of the refractory oxide material. If other refractory oxide material is used, then suitably this is selected from alumina, silica, magnesia, zirconia, boria and zinc oxide. Good results have been found using a mixture of titania and silica as refractory oxide material.

Titania is naturally available in several forms or polymorphs: rutile, anatase and brookite. The most thermally stable form of titania is rutile and at very high temperatures the anatase form can transform into the rutile form. Any of these forms of titania may be present in the catalyst composition of the invention. Good results have been achieved using titania having in excess of 70 wt % in the anatase form, most suitably 80 to 100 wt %, and especially 100 wt % anatase.

It has been found that the particle size of the titania can influence and accentuate the activity of the final catalyst composition. While all titania powders are suitable for use in the present invention, it is preferred that titania powder having an average particle diameter of 50 microns or less is used, preferably a particle diameter of 20 microns or less and especially a particle diameter of 5 microns or less. Generally the minimum average particle diameter of particle in the titania utilised is of the order of 0.005 micron. Herein average particle diameter is the diameter of 50% of the particles, also termed $D_v 50$.

Very suitable titania starting materials are available from Millenium Chemicals, Degussa and Haishunde. For example Millenium's DT-51D and G5 grades; Degussa's P25 grade and Haishunde's grade FCT010925. Mixtures of titania and other refractory oxide materials are also readily available commercially, for example silica-titania mixtures such as grade FTS 01 from Haishunde.

The B.E.T. surface area of the titania utilised is suitably in the range of from 10 to 700 m$^2$/g, more preferably from 20 to 400 m$^2$/g.

The Group VIII metal is preferably one or two non-noble metals selected from nickel, cobalt and iron. Preferably the Group VIII metal is selected from nickel, cobalt and a combination of nickel and cobalt. Most preferably the Group VIII metal is nickel. The Group VIb metal is preferably one or two non-noble metals selected from chromium, molybdenum and tungsten. The Group VIb metal is more preferably selected from molybdenum, tungsten and a combination of the two. The most preferred Group VIb metal is dependent on the temperature of end use. In applications where the end use is in a reactor temperature of below 380° C., it is preferably molybdenum, and where the end use temperature is 380° C. or above, it is preferably tungsten or a mixture of molybdenum and tungsten.

A preferred catalyst composition of the present invention, expressed in elemental form, is a catalyst composition of the general formula, on an oxide basis, $$(X)_b(M)_c(Z)_d(O)_e \qquad (I)$$

wherein

X represents at least one non-noble Group VIII metal;

M represents at least one non-noble Group VIb metal;

Z represents titanium and optionally one or more elements selected from aluminium, silicon, magnesium, zirconium, boron and zinc;

O represents oxygen;

one of b and c is the integer 1;

and d, e, and the other of b and c each are suitably a number greater than 0 such that the molar ratio of b:c is in the range of from 0.2:1 to 10:1, the molar ratio of d:c is in the range of from 0.1:1 to 30:1, and the molar ratio of e:c is in the range of from 3.4:1 to 73:1;

As above X is preferably one or two non-noble metals selected from nickel, cobalt and iron. Preferably X is selected from nickel, cobalt and a combination of nickel and cobalt. Most preferably X represents nickel. The metal M is preferably one or two non-noble metals selected from chromium, molybdenum and tungsten. M is more preferably selected from molybdenum, tungsten and a combination of the two. The most preferred metal M is dependent on the temperature of end use, as above.

The element represented by Z together with a portion of the oxygen component is derived from the refractory inorganic oxide starting material. Most preferably Z represents titanium as the predominant, especially the sole, element. As optional additional elements Z, aluminium and silica are the most preferred. Additional small amounts (in the range of from 1 to 3 wt %) of zinc oxide in the refractory oxide starting material can be advantageous to increase surface area of the catalyst composition.

The numbers b, c, and d represent the relative molar ratio values which are given taking one component as a standard or reference. Herein one of b and c is taken as the reference and designated as the integer 1. The other values are then established as relative values, basis one of the metals X and M on an oxide basis. The number e indicates the molar ratio value for oxygen in the composition (I) which will be set by the stoichiometry of $(X)_b(M)_c(Z)_d(O)_e$.

Preferably c is the integer 1, and the ratio b:c is in the range of from 0.4:1 to 7:1, most preferably 0.5:1 to 5:1, especially 0.8:1 to 3:1; the ratio d:c is in the range 0.2:1 to 10:1, most preferably 0.3:1 to 5:1, especially 0.4:1 to 3:1; and this results in ratio e:c being in the range of from 3.8:1 to 30:1, most preferably 4.1:1 to 18:1, especially 4.6:1 to 12:1.

Good results have been obtained when X is nickel; M is molybdenum; Z is titanium; O is oxygen; c is 1; b:c is in the range of from 0.5:1 to 3:1, especially 0.8:1 to 2.5:1, and is most especially 1:1 to 2:1; d:c is in the range of from 0.2:1 to 4:1, especially 0.3:1 to 3:1, and is most especially 0.4:1 to 2:1; and e:c is in the range of from 3.9:1 to 14:1, especially 4.4:1 to 12:1, and is most especially 5:1 to 9:1.

Depending on the method of preparation that is followed to prepare the catalyst composition for use in the invention, there could be residual ammonia, organic species and/or water species present; following different methods, different amounts as well as different types of species can be present. In respect of water, also atmospheric conditions can affect the amount present in the catalyst composition. Therefore to ensure that the catalyst composition definition is not distorted by atmospheric or preparation conditions, the definition used herein, on both an elemental basis and on percentage amount basis, is given on an oxide basis.

To establish the catalyst composition on an oxide basis, an elemental analysis is performed on a sample once all volatiles have been removed, eg by thorough heating for example at a temperature in excess of 400° C. for a minimum of 60 minutes, in accordance with standard practice in the art.

Expressed on a percentage weight basis, very suitably the amount of Group VIII metal(s) lies in the range of from 2 to 80 wt % as the oxide and based on total catalyst, but preferably is in the range of from 6 to 75, more preferably 10 to 65, especially 14 to 53 wt %. Very suitably the amount of Group VIb metal(s) is in the range of from 5 to 90 wt % as the oxide, preferably 10 to 80 wt %, more preferably 15 to 75 wt %, and especially 27 to 70 wt %.

The total amount of Group VIII and Group VIb metals in the composition of the invention, as the oxide, is very suitably in the range of from 30 to 95 wt %, preferably 50 to 95 wt %. The minimum amount of total metals is suitably 30 wt %, but is generally 50 wt %, more preferably 65 wt %, and especially 70 wt %. Preferably the maximum amount is 95 wt %, more preferably 90, especially 85 wt %. The total amounts of metals is especially substantially 80 wt %.

The balance of the catalyst composition, on an oxide basis, is generally derived from a refractory oxide material, suitably in an amount in the range of from 5, more preferably from 10, and especially from 12 wt %, to 70 wt %, preferably to 50, more preferably to 35, most preferably to 30, especially to 25. Preferred compositions contain from 10 to 30 wt %, more preferably from 15 to 25 wt %, and especially contain substantially 20 wt %, on an oxide basis.

Good results have been obtained when X is nickel and is present in an amount in the range of from 8 to 55 wt %, preferably 13 to 50 wt %, and especially 17 to 44 wt %; when M is molybdenum present in an amount in the range of from 20 to 80 wt %, preferably 30 to 70 wt %, and especially 35 to 66 wt %; and when titanium is present in an amount in the range of from 8 to 40 wt %, preferably 10 to 35 wt %, and especially 15 to 30 wt %, all on oxide basis, i.e. in the form of $NiO/MoO_3/TiO_2$ In a catalyst composition for use in the invention, when not assessed on an oxide basis, there may be in the range of from 0 to 10 wt %, basis total catalyst, of residual species, eg organics, ammonia and/or water species, and most commonly from 3 to 8 wt %. The presence and amount of such components can be determined by standard analysis techniques.

The catalyst composition of the present invention may be prepared by any suitable precipitation process. The present invention therefore further provides a process for the preparation of a catalyst composition of the present invention, wherein one or more Group VIb metal compounds are combined with one or more Group VIII metal compounds, and with a titania-containing refractory oxide material, in the presence of a protic liquid and optionally an alkali compound; and the catalyst composition is recovered following precipitation.

The preparation process may very suitably be by the procedure described in U.S. Pat. No. 6,162,350, in WO 00/41810, or indeed described in EP-A-1 090 682, in which the metal compounds are either fully dissolved or partly dissolved in the liquid used, suitably protic liquid, especially water or water-containing liquid, with the addition of the appropriate amount of refractory oxide material to one of the starting components or to a mixture of starting components. Where fully dissolved metals and alkali compound are both utilized, it is preferred that a solution of fully dissolved metals is added to a slurry of refractory oxide material and alkali compound; this gives preferred materials over the process of addition of alkali compound to a slurry of solid refractory oxide and fully dissolved metals.

Most preferably, however, the preparation is by a process which comprises heating a precursor composition which is in the form of, or is recovered from, a slurry, optionally after aging at a temperature in the range of from 20 to 95 deg C. for a minimum of 10 minutes, said slurry being obtained by (co)precipitating, at a sufficient time and temperature, one or more Group VIb compounds, one or more Group VIII compounds, one or more refractory oxide materials, and an alkali compound, in a protic liquid. This process yields material which gives high crush strength when shaped eg extruded. Where the metal compounds are used as solids (and one or more partly dissolve when coming into contact with the protic liquid), the crush strength of the resulting shaped catalyst is even higher, though the reason for this is not fully understood.

Thus preferably, the metal compounds utilised in the process of the invention are added to the protic liquid in solid form.

The metal compounds and refractory oxide are suitably utilised in the percentage weight amounts already discussed above.

Expressed in elemental terms, the preferred catalyst composition is preferably prepared by decomposition of a precursor of the general formula $$(NH_4)_a(X)_b(M)_c(Z)_d(O)_e \qquad (II)$$

in which a is a number greater than 0, and X, M, Z, b, c, d and e have the meanings given above. The molar ratio of a:(b+c) is suitably from 0.1:1 to 5:1, preferably from 0.1:1 to 3:1, especially 0.5:1 to 2:1. Preferably c is the integer 1 and the molar ratio b:c is from 0.4:1 to 7:1, more preferably from 0.5:1 to 5:1, especially 0.8:1 to 3:1; the molar ratio represented by d:c is preferably from 0.2:1 to 10:1, more preferably from 0.3:1 to 5:1, especially 0.4:1 to 3:1; and the molar ratio represented by e:c is preferably from 3.8:1 to 30:1, more preferably 4:1 to 18:1, especially 4.6:1 to 12:1.

The decomposition or heating of the precursor is performed at an elevated temperature in the range of from 100 to 600° C., preferably from 120 to 450° C., more preferably at a temperature in the range of from 250 to 400° C. The decomposition may take place in an inert atmosphere, such as under nitrogen, any noble gas or a mixture thereof, or in an oxidative atmosphere, e.g. in oxygen, oxygen-nitrogen, air, or a mixture of one or more thereof, or in a reductive atmosphere, such as hydrogen, hydrogen sulfide, or a mixture thereof. The decomposition may take place during processing of the slurry or during further processing of the composition for use, eg during extrusion or calcination before or after shaping.

The preferred preparation process of the present invention involves contacting one or more slurries of the desired metals in a protic liquid (for example water) wherein one or more of the metal compounds, especially both, are in solid and dissolved phase simultaneously, with a refractory oxide in the presence of an alkali compound at a temperature and for a time sufficient to produce the precursor. It is possible for each metal type that the metal is provided by two metal compounds, one of which is soluble in the protic liquid and the other of which is only partly soluble. Metal in this context does not refer to the metals in metallic phase but to metallic compounds containing the necessary metal ions.

It is possible for all components to be added to the protic liquid at the same time or sequentially. Also it is possible for one or more of the metal compounds and the refractory oxide to be in slurry phase with the protic liquid, and for the remaining components to be added thereto.

The process of the invention most suitably involves the mixing of slurry phase mixtures of the Group VIb and Group VIII metal(s) compounds in water or other protic liquid blended at elevated temperature with a slurry of an alkali compound and the refractory oxide material also in water or other protic liquid. While the order of addition to form slurries from the individual compounds is not critical for the formation of the catalyst composition of the invention, we have found that when the alkali compound is added to a slurry of partly dissolved metals and the refractory oxide, very useful catalytic materials are given. It is, however, possible to add the metals' slurry to the alkali compound, with the refractory oxide present in one or the other or both, and still obtain useful catalytic compositions.

Blending or mixing can be carried out by any conventional means, eg an anchor stirrer, or high energy, high impact method, for example using an Ultra Turrax machine.

During the mixing or blending process, the components of the slurries (co)precipitate to form solids of the precursor composition preferably under the action of the alkali precipitation agent. Normally the term 'co-precipitation' is used when two or more compounds that are dissolved, precipitate out of solution together. In the preferred process of the invention, a portion of the compounds are not dissolved and it is possible that one or more dissolved components precipitate onto the solid component(s). Therefore we prefer to use herein the terminology '(co)precipitation' when referring to precipitation of materials at least one of which is in a partly dissolved state. The process of the invention is suitably controlled through the maintenance of an appropriate temperature for an appropriate time to achieve the desired precursor. It is a routine matter to determine the appropriate temperature/time combinations for a desired end product. Suitably the temperature will lie in the range of from 25 to 95° C. and the (co)precipitation time will lie in the range of from 10 minutes to 2 hours. While essentially desired end products will arise from a control of both conditions, it is noted that operating the (co)precipitation process at higher temperatures may cause too much dissolution of the metals components to enable a good end-product; at too low a temperature then insufficient dissolution may occur.

In a preferred embodiment, an initial slurry concentration of in the range of from 2 to 40, preferably 2 to 25 wt % of nominal solids content is aimed for. By nominal solids content, the amount of solids added to the protic liquid is intended. Preferably the amount of alkali compound, eg ammonia, in the slurry is at least 0.2 mol per mol of metals M+X, on an oxide basis, and at most 50 mol per mol of metals M+X, on an oxide basis. The quantity of alkaline material can affect the final form of the catalyst composition. The amount of alkaline material, eg ammonia, preferably applied should be at least 0.75 mol, more preferably at least 0.8, especially at least 0.9 mol, per mol metals M+X, oxide basis. The amount of alkali compound utilized is preferably at most 5, more preferably at most 3, and especially at most 2, mol per mol metals M+X, oxide basis.

Suitable Group VIII compounds, which stay in partly solid phase if the solvent is water, and therefore are preferred, are nickel carbonate, nickel oxide, nickel hydroxide, nickel phosphate, nickel formiate, nickel sulfide, nickel molybdate, or a mixture of two or more thereof. Additionally soluble salts such as nickel nitrate, sulphate or acetate may be used in combination with one or more of these compounds and/or with each other. The corresponding cobalt or other Group VIII metal compounds are also suitable. Suitable, and preferred, molybdenum compounds (based on a similar criteria) are molybdenum (di or tri) oxide, ammonium molybdate, molybdic acid, molybdenum sulfide, or mixtures thereof. These materials are commercially available or can be prepared by commonly known laboratory practices, e.g. by precipitation. The corresponding tungsten or other Group VIb metal compounds are also suitable.

Starting materials having a C, H, and O component in addition to the desired metals are, in general, more preferred due to a lesser impact on the environment. Nickel carbonate is therefore more preferred, since it can decompose to nickel oxide, carbon dioxide and water upon heating, based on the carbonate content of the starting material.

Suitable alkali compounds applied to prepare the slurry with the refractory oxide material are selected from hydroxides or oxohydroxides, for example, Group IA, or IB or Group IIA, or IIb hydroxides, Group IA or Group IIA silicates, Group IA, or IB or Group IIA or IIB carbonates, and equivalent ammonium compounds, or mixtures of any two or more thereof. Suitable examples include ammonium hydroxide, sodium hydroxide, ammonium silicate, ammonium carbonate, and sodium carbonate. Preferably the alkali compound is one that will generate ammonium ions in solution; this includes ammonia which, with water as the solvent, will generate the ammonium hydroxide form.

It is generally preferred to utilise mixing and precipitation conditions, which keep the solvents below the boiling point temperatures of the applied solvent, i.e. below 100° C. in case of water. The pH of the slurries is generally kept at their natural pH during the entire preparation process. However additional adjustment of the pH can be conveniently achieved, if desired, by using suitable acidic or alkaline compounds generally known in the art.

The formed slurry is optionally held at ambient or elevated temperature for a period of time (commonly termed ageing) subsequent to the end of the (co)precipitation process. The ageing time usually lies in the range of from 10 minutes, suitably 30 minutes, to preferably 4 hours; the ageing temperature may be in the range of from ambient temperature, for example, from 20, suitably from 25° C., to 95° C., preferably from 55 to 90, and especially from 60 to 80° C. The ageing period is optionally followed by cooling the obtained mixture to a lower temperature.

After optional cooling, the obtained slurry may be processed in a number of different ways in order to regain the solid content, which process can involve filtration, spray drying, flash drying, evaporation, and vacuum distillation. By evaporation, any process of driving off the protic liquid, e.g. water, or drying is intended, for example dessication and boil down processes. The system used will depend on a number of local factors including environmental legislations, and energy availability. Most preferred are filtration and spray drying. The former is quick and not energy intensive but requires several reiterative steps, especially in closed loop manufacturing processes where the mother liquor is reused, and produces higher volumes of waste water; the latter is energy intensive but generates little waste.

The most preferred combination is to use the preferred slurry preparation process (utilising alkali compound) in combination with spray drying.

The so-prepared solid product is a powder which has a loss on ignition LOI of 5 to 95%.

Herein loss on ignition (LOI) for a material is the relative amount of lost mass upon heating the material to 540° C. following the procedure: The sample is mixed well to prevent any inhomogeneity. The weighed sample is transferred into a weighed and precalcined crucible. The crucible is place to a preheated oven at 540° C. for a minimum time of 15 minutes, but typically for 1 hour. The crucible containing the dried sample is weighed again, and the LOI is determined according to the formula:

$$LOI\% = (w - w_{calc})/w * 100\%$$

where $w$ is the original weight of the sample, $w_{calc}$ is the weight of the calcined sample after heating in the oven, both corrected with the weight of the crucible.

The prepared powder may be dried before optional further processing, especially where filtration has been used to isolate or recover the solids. This drying or ageing can take place in any suitable atmosphere, e.g. inert, such as nitrogen, noble gases, or mixtures thereof, or oxidative gases, such as oxygen, oxygen-nitrogen mixture, air, or mixtures thereof, or a reductive atmosphere, such as hydrogen, or mixtures of reductive and inert gases or mixtures thereof, with or without ammonia and/or water moisture present. The drying temperature is preferred to lie in the range of from 20, usually 25, to 200° C., preferably 55 to 150° C. and especially from 70 to 130° C.

The powder may be used as such or, more preferably is used as a shaped catalyst formulation.

Optionally the obtained powder is calcined prior to shaping. Suitable calcination temperatures are in the range of from 100 to 600° C., preferably from 120 to 450° C. eg under 400° C. The calcination may also be carried out in any suitable atmosphere, e.g. inert gases as nitrogen, noble gases or a mixture thereof, or in a reactive atmosphere, e.g. oxygen, oxygen-nitrogen, air, or a mixture of one or more thereof, or a mixture of inert and reactive gases.

Prior to shaping, the obtained powder is optionally mixed with additional materials in either solid or liquid phase. Those in solid state include catalytically active materials, e.g. other catalytic materials generally used in hydrotreating applications. It is also possible to combine the obtained powder with catalytically active materials that are used in other hydroconversion processes, for example hydrocracking. Thus the powder may be combined with a cracking component, such as a zeolitic or other component that promotes hydrocracking—the conversion of a hydrocarbon feedstock to one of a lower boiling point. Such components include faujasite materials, such as zeolite Y, ZSM-5, ZSM-21, zeolite beta, or combinations thereof. Certain amorphous silica alumina materials have a cracking function and may be utilised. It is unnecessary to add to the powder any material that would act solely as a binder, but of course it is possible.

Where desired, other supplementary materials can be added. These include materials usually added during conventional catalyst preparations. Suitable examples are phosphorus materials, e.g. phosphoric acid, ammonium phosphate, or organic phosphor compounds, boron compounds, fluor containing compounds, rare earth metals, additional transition metals, or mixtures thereof. Phosphorous compounds may be added at any step of the preparation. If e.g. alumina is used as part of the refractory oxide material, phosphorous compounds can be used for peptising (with or without nitric acid).

Moreover, added materials may include additives typically referred in the art as 'shaping agents' or 'shaping aids'. Those additives may comprise stearates, surfactants, graphite, or mixtures thereof. For maximum strength in the resulting shaped materials however, particularly where shaping is by extrusion, then it is preferred to minimize the amount of any conventional extrusion aids. Most preferably, shaping is performed by extrusion in the absence of any extrusion aids.

The dried powders prepared by decomposition of the precursor compound, can exhibit crystalline reflections when examined by powder XRD diffraction analysis. These reflections are characteristic of the titanium (and any cobalt) in the prepared material. Following shaping by extrusion and calcination it has been found that some of the shaped catalyst compositions exhibit other reflections which are characteristic of layered double hydroxide material. This material is normally undesirable in a catalyst material prior to shaping because the resulting extruded product has a reduced crush strength. In the compositions of the present invention such hydroxide material only appears to arise after extrusion in certain cases, and no such reduced crush strength has been found.

Suitable materials in liquid phase may additionally be added to the shaping mixture obtained, which include protic, e.g. water, polyols, etc., and non-protic liquids, e.g. hydrocarbons. Protic liquids, e.g. water, may be added for example in order to bring the LOI content of the mixture to a suitable level for shaping.

In general, there is no particular order of mixing the materials (in solid and/or liquid form) together. What is important is to ensure that the sample is mixed well to prevent nonhomogeneity. The amount of additional solids and liquids added during shaping lies preferentially in the range of from 0 to 95 wt % based on final weight, and depends on the requirements of the anticipated catalytic application. Shaping can be performed in various ways depending on the requirements of the application. Those methods include spray drying, extrusion, beading and/or pelletizing among others.

Sulfidation may be performed in order to turn one or more metals into its active form. If the composition is used as a shaped catalyst composition, then it may be sulfided before and/or after shaping. No special sulphiding procedure is necessary for the catalyst composition of the invention. In general, sulfidation may be carried out by contacting the catalyst or precursor with a sulfur containing material, e.g. elemental sulfur, sulfides, disulfides, etc. in gas or liquid phase. Sulfidation can be carried out at any step of the shaping procedure, including prior to the first optional drying step. It is preferred, however, that sulfidation is carried out only prior to shaping when any of the subsequent heat treatments performed are carried out under a suitable atmosphere that prevents the conversion of the (partly) sulfided phase back to an oxide state.

Preferably the sulfidation step is carried out subsequent to the shaping step(s), and, if applied, subsequent to the last calcination step. The sulfidation may be carried out ex situ (with an appropriate procedure) prior to loading the catalyst into a hydroprocessing unit. Common ex-situ procedures are the ACTICAT process (CRI International Inc.) and the SULFICAT process (Eurecat US Inc.). It is however preferred that the last sulfidation procedure is carried out in situ as follows.

The catalyst is sulfided into the active catalyst form by means of sulfidation carried out in the presence of hydrogen, by either contacting the catalyst with liquid feedstock (in liquid or partly gaseous phase), which contains and/or is enriched in sulfur, where sulfur is present in the form of an organic sulfur compound and/or elemental sulfur, or in the presence of a sulfur containing gas, or a mixture thereof.

Surface area of the final shaped product measured by the B.E.T. method, using nitrogen as adsorbate, generally lies in the range of from 10 to 350 m$^2$/g, preferably from 30 m$^2$/g, more preferably from 40 m$^2$/g to preferably 300 m$^2$/g, more preferably 200 m$^2$/g. Pore volume of the final product, measured using nitrogen adsorption up to 95 nm on the B.E.T. adsorption curve, preferably lies in the range of from 0.002 to 2.0 cm$^3$/g, preferably from 0.05 to 1.5 cm$^3$/g, more preferably to 1.2 cm$^3$/g. Most preferred is a pore volume in the range of from 0.08 to 1.0 cm$^3$/g. Flat bed crush strength, as measured by ATSM D 6175, is preferably in excess of 100 N/cm.

Catalysts which comprise a catalyst composition of the present invention exhibit a very high activity for hydrodesulphurisation and hydrodenitrification of hydrocarbon feedstocks. This activity is higher than that found for equivalent NiMo and CoMo catalysts prepared by (co)precipitation with alumina or silica.

While not wishing to be bound to any theory, it is currently thought that this exceptional activity is the result of a high dispersion factor for the metals through the oxide material, achieved through the careful control of the (co)precipitation process. High dispersion should not be confused with uniformity of dispersion; the catalyst compositions for use in and of the invention have a high activity with metals dispersed through the oxide material, but are not necessarily uniformly dispersed.

The catalyst compositions of the invention have a particularly good activity for hydrodesulfurisation (HDS) and hydrodenitrogenation (HDN). In the art of refinery processing, a number of terms may be used to refer to processes which require HDS and HDN activity in some form. These terms include hydrotreating, hydrofinishing, hydrofining and hydrorefining. The compositions of the present invention therefore find use in all these hydroprocessing reactions. Useful hydrogenation activity particularly of aromatics (also known in the art as hydrodearomatisation) has also been found for these compositions.

Hydrocarbon feedstocks that contain sulfur and nitrogen include any crude or petroleum oil or fraction thereof which have a measureable sulfur and nitrogen content. The feedstocks may be previously untreated or have already undergone such treatment as fractionation, for example atmospheric or vacuum distillation, cracking for example catalytic cracking, thermal cracking, or hydrocracking, or any other hydroprocessing treatment.

Examples of suitable hydrocarbon feedstocks include catalytically cracked light and heavy gas oils, hydrotreated gas oil, light flash distillate, light cycle oil, vacuum gas oil, light gas oil, straight run gas oil, coker gas oil, synthetic gas oil, and mixtures of any two or more thereof. Other possible feedstocks include deasphalted oils, waxes obtained from a Fischer-Tropsch synthesis process, long and short residues, and syncrudes, optionally originating from tar sand, shale oils, residue upgrading processes and biomass.

The feedstock may have a nitrogen content of up to 10,000 ppmw (parts per million by weight), for example up to 2,000 ppmw, and a sulfur content of up to 6 wt %. Typically, nitrogen contents are in the range of from 5 to 5,000 ppmw, most suitably in the range of from 5 to 1500 or to 1000, eg from 5 to 500, ppmw, and sulfur contents are in the range of from 0.01 to 5 wt %. The nitrogen and sulfur compounds are usually in the form of simple and complex organic nitrogen and sulfur compounds.

The catalyst compositions may be applied in any reactor type but are most suited for use in a fixed bed reactor. If necessary two or more reactors containing the catalyst may be used in series.

The catalyst compositions may be applied in single bed and stacked bed configurations, where the compositions are loaded together with layers of other treatment catalyst into one or a series of reactors in consecutive order. Such other catalyst may be for example a further hydroprocessing catalyst or a hydrocracking catalyst. Where the composition of the invention is exposed first to the feedstock, then a second catalyst is most suitably a catalyst which is susceptible to nitrogen-poisoning.

The process of use of the invention may be run with the hydrogen gas flow being either co-current or counter-current to the feedstock flow.

The process of use of the invention is operated under the conditions of elevated temperature and pressure which are conventional for the relevant hydroprocessing reaction intended. Generally, suitable reaction temperatures lie in the range of from 200 to 500° C., preferably from 200 to 450° C., and especially from 300 to 400° C. Suitable total reactor pressures lie in the range of from 1.0 to 20 MPa.

Typical hydrogen partial pressures (at the reactor outlet) are in the range of from 1.0 to 20 MPa (10 to 200 bar), and preferably from 3.0 to 15.0 MPa (50 to 150 bar), especially at 3 to 10 Mpa (30 to 100 bar) at which pressure compositions of the present invention have been found to have a particularly improved activity.

The hydrogen gas flow rate in the reactor is most suitably in the range of from 10 to 2,000 Nl/kg liquid feed, for example 100 to 1000 Nl/kg, more suitably 150 to 500 Nl/kg.

A typical liquid hourly space velocity is in the range of from 0.05 to 10 kg feedstock per litre catalyst per hour (kg/l/h), suitably from 0.1 to 10, preferably to 5, more preferably from 0.5 to 5, kg/l/h.

The compositions for use in the present invention are normally sulfided before use. Such procedures are well known to the skilled person. Suitable procedures have been discussed above.

The following Examples illustrate the present invention.

EXAMPLES

In these Examples the following test methods have been followed to provide the measurements given B.E.T. Measurement: ASTM D 3663-99, as modified by ISO 9277, with drying of the sample at 300° C. for 60 minutes prior to measurement, and using nitrogen as adsorbate. Pore volume: obtained from nitrogen adsorption up to 95 nm on the B.E.T. adsorption curve.

Nominal composition proportions are given herein as percentages by weight.

With the exception of Examples 9 and 10, the titania used in each of the Examples of the invention is grade DT-51D obtainable from Millenium Chemicals which has a BET surface area of 88 $m^2/g$ and is 100% anatase titania, on oxide basis.

Example 1

$CoO/MoO_3/TiO_2$ 41 wt %/39 wt %/20 wt %

In a 5 litre bulb, 2933 g water were heated to 80° C. Subsequently 84.2 g titania, 273.1 g cobalt carbonate, and 184.9 g ammonium dimolybdate (containing 56.5 wt % Mo) were added to the water. Shortly after, 161.5 g ammonia solution (25 wt % ammonia content) were added while maintaining the temperature at 80° C. The pH was 9.5. After 30 minutes the heating was switched off.

The slurry was spray dried. In total 453 g solid material was recovered. The powder was extruded, dried and calcined at 300° C. in air.

The so-obtained extrudates exhibit a B.E.T. surface area of 63.8 $m^2/g$. The nitrogen pore volume, measured up to 95 nm on the B.E.T. adsorption curve, was 0.23 $cm^3/g$.

Example 2

$CoO/MoO_3/TiO_2$ 27 wt %/53 wt %/20 wt %

Into a 2 l bulb, 1506 g water were weighed and heated to 80° C. Subsequently, one after the other, the following compounds were added: 42.1 g $TiO_2$, 95.4 g cobalt carbonate, and 124.1 g ammonium dimolybdate. The slurry was stirred for 5 minutes while the temperature was maintained at 80° C. Thereafter, 55.7 g ammonia 25 wt % solution were added to the slurry.

The temperature was kept at 80° C. for 30 minutes. The pH was 9.7 (as determined from a small test portion cooled to room temperature and the pH measured at room temperature). After 30 min, the heating was switched off, and the slurry was spray-dried over about 30 minutes.

The obtained powder was extruded, dried and calcined. The product exhibited a B.E.T. surface area of 56.4 $m^2/g$. The nitrogen pore volume, measured up to 95 nm on the B.E.T. adsorption curve, was 0.097 $cm^3/g$.

Example 3

$CoO/MoO_3/SiO_2$

Comparative Sample 27 wt %/53 wt./20 wt %

Into a 2 litre bulb, 1000 g water were measured. 124.1 g ammonium dimolybdate and 91.54 g cobalt carbonate (59.84 wt % CoO) were added to the water, while stirring with a pseudo-anchor type stirrer. The slurry was heated to 80° C. over half an hour. Additionally, another slurry of 44.9 g silica, (SIPERNAT 50) 502 g water and 55.7 g ammonia (25 wt % ammonia content) was prepared simultaneously.

As soon as the first slurry was at 80° C., it was added to the metal-containing slurry. The temperature was maintained at 80° C. for the remaining hour, while the pH was 7.4. The resulting slurry was spray-dried and yielded 206 g of powder.

The powder was extruded, dried and calcined at 300° C. The so-obtained extrudates exhibited a B.E.T. surface area of 74 $m^2/g$. The nitrogen pore volume, measured up to 95 nm on the B.E.T. adsorption curve, was 0.24 $cm^3/g$.

Example 4

Comparison of Gas Oil Test of the Catalysts of Example 1, Example 2 and Example 3

Gas oil hydrodesulphurisation (HDS) testing was performed in a nanoflow setup under trickle flow conditions, using full range ("virgin") straight run gas oil as feed. The catalysts were crushed and sieved into a 30-80 mesh size fraction which is the size most suited for catalytic testing in a tubular trickle flow reactor. After drying, they were loaded into the reactors with SiC as diluent to ensure proper plug flow conditions. Prior to testing, the catalysts had been sulfided with the feed itself, according to a procedure generally applied in the refinery for calcined hydrotreating catalysts.

Testing was performed at 345° C., under 55 bar hydrogen partial pressure, with a hydrogen gas rate of 250 Nl/kg feed. No additional $H_2S$ was added to the recycle gas. The liquid hourly space velocity (LHSV) was set to 1.75 $1.1^{-1}.h^{-1}$. The feed contained 1.63 wt % organic sulfur, and 165 ppmw organic nitrogen.

Data for both HDS and HDN (hydrodenitrogenation) performance were collected. Relative volumetric activities (RVAs) of the catalysts are displayed in Table 1, and are based on the pseudo first order reaction rate constants (k) for the two reactions calculated from the sulfur and nitrogen content of the effluent stream. By this, the result of one test run (here that for the catalyst of Example 3) is set at 100% conversion and the RVA for the other test catalysts indicates what percentage increase in activity was found. For the catalysts of Examples 1 and 2 the HDS RVA values are exceptionally high; the HDN RVA values are also significantly increased.

TABLE 1

Pseudo first order reaction rate constants and relative volumetric activities of Example 1, Example 2 and Example 3 in HDS and HDN reaction using full range straight run ("virgin") gas oil as feed.

| Refractory oxide | Example 1 titania | Example 2 titania | Example 3 silica |
|---|---|---|---|
| S in product (ppmw) | 59 | 64 | 507 |
| Conversion of sulfur (%) | 99.6 | 99.6 | 96.9 |
| $k_{HDS}$ (l·l$^{-1}$·h$^{-1}$·% wt S$^{-1}$) | 42.6 | 41.2 | 12.8 |
| Relative volumetric HDS activity (%) | 333% | 322% | 100% |
| N in product (ppmw) | <1.0 | <1.0 | 4.4 |
| Conversion of nitrogen (%) | 99.4 | 99.4 | 97.3 |
| $k_{HDN}$ (l·l$^{-1}$·h$^{-1}$·% w N$^{-1}$) | 70.8 | 70.3 | 39.3 |
| Relative volumetric HDN activity (%) | 180% | 178% | 100% |

Table 1 clearly demonstrates the advantage of using titania as the refractory oxide when formulating the catalyst with CoMo active phase. An order of magnitude lower sulfur content in the product can be achieved by using the titania containing catalyst and the conversion of both sulfur and nitrogen is increased significantly reaching almost total conversion. When expressed as relative volumetric activity: the hydrodesulfurization activity is approximately three times higher with titania as refractory oxide present, and hydrodenitrification activity is almost twice as high compared to the silica counterpart.

Example 5

NiO/MoO$_3$/TiO$_2$ 27 wt %/53 wt %/20 wt %

In a 5 litre bulb 2972 g water were heated to 80° C. Upon reaching this temperature, 84.2 g titanium dioxide, 220.3 g nickel carbonate (39 wt % nickel), and 248.5 g ammonium dimolybdate were added to the water. Shortly thereafter, 111.6 g ammonia solution (with 25 wt % ammonia content) were mixed with the above slurry. The resulting mixture was kept at 80° C. for 30 minutes. The pH was 8.3.

After 30 minutes the heating was switched off. 344 g of solid material were recovered by means of spray-drying. The powder was extruded, and the obtained green extrudates were dried and then calcined at 300° C.

The B.E.T. surface area of the resulting product was 42 m$^2$/g. The total (nitrogen) pore volume measured up to 95 nm on the B.E.T. adsorption curve was 0.123 cm$^3$/g. The elemental analysis gave NiO/MoO$_3$/TiO$_2$—27.5 wt %/51.3 wt %/20.8 wt %, which corresponds to b:c=1.0:1, d:c=0.7:1, e:c=5.5:1.

Example 6

NiO/MoO$_3$/SiO$_2$

Comparative Sample 27 wt %/53 wt./20 wt %

In a 2 litre bulb 1485 g water were weighed and heated to 80° C. Subsequently 44.9 g Sipernat 50 silica, 108.7 g nickel carbonate (39.5 wt % Ni) and 124.3 g ammonium dimolybdate were added, while maintaining the temperature at 80° C. Shortly thereafter, 55.7 g ammonia solution (25 wt % ammonia content) were added to the slurry.

After 30 minutes, the heating was switched off. The pH was 7.44. The slurry was spray-dried yielding 204 g of powder in total. The powder was turned into the final product by extrusion, drying and calcination at 300° C.

The B.E.T. surface area of the calcined product was 42 m$^2$/g. Measured up to 95 nm on the nitrogen adsorption curve in the B.E.T. method, the nitrogen pore volume was 0.132 cm$^3$/g.

Example 7

Comparison of Gas Oil HDS and HDN Test of the Catalysts of Example 5 and Example 6

Following a typical sulfidation procedure resembling an industrial scale operation, the catalysts obtained by the procedure of Example 5 and Example 6 were turned into their sulfidic state. The catalytic activity of the so-obtained products was measured in HDS and HDN operation. The test data was collected from a microflow tubular reactor under trickle flow conditions using full range straight run ("virgin") gas oil. Two feedstocks with close to identical properties were employed; details are given in Table 2.

TABLE 2

Selected properties of feeds used in performance testing

| Feed | Feed A | Feed B |
|---|---|---|
| S XRF (wt %) | 1.62 | 1.63 |
| N (ppmw) | 152 | 165 |
| Density (20/4) (cm$^3$/g) | 0.86 | 0.86 |
| TBP at 10% wt (° C.) | 241 | 236 |
| TBP at 50% wt (° C.) | 316 | 321 |
| TBP at 90% wt (° C.) | 382 | 388 |
| TBP at 96% wt (° C.) | 397 | 403 |

Testing was performed under constant effluent sulfur content at 55 bar and at 1.0 h$^{-1}$ liquid hourly space velocity of feed. Test data collected after 500 hours on stream, and expressed as the temperature (measured in ° C.) required for obtaining 10 ppmw sulfur in the product are shown in Table 3. The obtained nitrogen content in the product at the temperatures shown is also given in Table 3 as the measure of the HDN activity.

TABLE 3

Comparison of HDS and HDN activity of catalysts at constant effluent sulfur content using a full range straight run ("virgin") gas oil as feed

| Catalyst<br>Refractory oxide | Example 5<br>titania | Example 6<br>Silica |
|---|---|---|
| Feed applied | Feed A | Feed B |
| Temperature required for 10 ppmw sulfur in product (° C.) | 330 | 342 |
| Pseudo first order reaction rate constant for HDS ($l \cdot l^{-1} \cdot h^{-1} \cdot wt\% \, S^{-1}$) | 38.81 | 25.76 |
| Relative volumetric activity for HDS | 151% | 100% |
| N content in product at reaction temperatures (ppmw) | <1 | <1 |
| Pseudo first order reaction rate constant for HDN ($l \cdot l^{-1} \cdot h^{-1} \cdot wt\% \, N^{-1}$) | 54.48 | 41.10 |
| Relative volumetric activity for HDN | 133% | 100% |

It can be seen from Table 3 that the catalyst made by using titania as the refractory oxide, achieves identical sulfur content in the effluent (product) stream at 12° C. lower temperature. When comparing the pseudo first order reaction rate constants for the HDS reaction, a significantly higher reaction rate constant is found in the case of the titania-containing catalyst, compared to the silica counterpart. This translates into a 51% improvement for volumetric activity using the silica-based catalyst as base case.

The elimination of nitrogen containing molecules from the feed is also considerably improved by the use of titania as the catalyst support. As is shown in Table 3, at temperatures where 10 ppmw sulfur was obtained in the product stream, both catalysts achieved nitrogen contents below the detection limit of measurement.

Converting this result into pseudo first order reaction rate constants for HDN helps to assess the differences in activity. Based on the reaction rate constants, a 32.6% increase in relative volumetric activity for nitrogen removal can be attributed to the use of titania (Example 5).

Example 8

Comparison of Aromatic Saturation Activity of the Catalysts of Example 5 and Example 6

The extent of aromatic saturation under the reaction conditions discussed in Example 7 was also evaluated. In order to eliminate possible variation in thermodynamic equilibria, the temperature was set to 345° C. in these tests. This ensured comparable sulfur slips for both catalysts. Full range straight run gas oil was used as feed, where only slight variations in the aromatic content were recorded between the two feeds applied in the tests.

The conversion levels calculated from aromatics content of the feed and the product measured in mmol/g (UV method) is listed in Table 4. Two conditions were measured at 60 bar hydrogen partial pressure, at 200 Nl/kg hydrogen gas flow rate applying hourly space velocities of 1.5 and 1.0 $l.l^{-1}.h^{-1}$ at 345° C. As guidance, the obtained sulfur in product (ppmw) is also indicated in Table 4.

TABLE 4

Selected properties of the feedstock used for testing aromatic saturation performance

| | LHSV ($l \cdot l^{-1} \cdot h^{-1}$) | | | |
|---|---|---|---|---|
| | 1.5 | | 1.0 | |
| UV aromatics conversion | silica | titania | silica | titania |
| Mono aromatics % | −15.6 | 5.8 | 6.7 | 27.1 |
| Di aromatics % | 88.1 | 91.7 | 89.6 | 93.2 |
| Tri aromatics % | 90.8 | 94.6 | 94.4 | 96.8 |
| Tri+ aromatics % | 91.4 | 94.7 | 94.1 | 96.2 |

'silica' indicates use of the catalyst of Example 6

'titania' indicates use of the catalyst of Example 5

Table 4 clearly illustrates the benefit of using titania as a refractory oxide in the catalyst composition. The largest benefit is seen in the hydrogenation of monoaromatic compounds. At 1.5 $l.l^{-1}.h^{-1}$ space velocity, the catalyst prepared with titania can achieve positive aromatics conversion, meaning a conversion beyond eliminating the mono-aromatic compounds that are produced by the hydrogenation of the di-aromatics, thus also converting those that were originally present in the feed.

At an hourly liquid space velocity of 1.0 $l.l^{-1}.h^{-1}$, the silica-containing catalysts can match this conversion level. However, the titania counterpart increased the conversion of these mono-aromatic compounds to 27.1%, maintaining the gap of ~20% difference in the conversion of these most difficult-to-eliminate compounds in the feed. This indicates a superior hydrogenation activity previously seen only with noble metal catalysts.

When translated into relative volumetric activity, the hydrogenation activity for mono-aromatic compounds can be seen to be at least 60-70% higher for the titania catalysts, based on the similar activities achieved at 1.0 $l.l^{-1}.h^{-1}$ with the silica sample, as achieved at 1.5 $l.l^{-1}.h^{-1}$ with the titania sample.

In the hydrogenation of heavier aromatic compounds, such as di-aromatics, tri-aromatics and heavier, the titania-containing sample preserves its leading performance as compared to the silica counterpart.

Example 9

Comparison of Activity Using Titania of Different Origin

Following the preparation route described in Example 5, several samples have been prepared using titania of various origin but combined with the same amount of nickel and molybdenum. Available properties, such as B.E.T. surface area, pore volume obtained from the adsorption curve of the B.E.T. method, and average particle size of the titania powders are shown in Table 5. The percentage of anatase content is also shown.

TABLE 5

Origin, type, B.E.T. surface area (SA), pore volume (PV), and particle size ($D_{v,50}$) of the powder, the anatase content, and the offset of temperature required (Treq) for 10 ppmw sulfur in product when processing full range straight run ('virgin') gas oil under trickle flow conditions.

| Origin | Type | $N_2$ SA ($m^2/g$) | $N_2$ PV ($cm^3/g$) | $D_{v,50}$ (μm) | anatase (%) | ΔTreq (° C.) |
|---|---|---|---|---|---|---|
| Degussa | P25 | 50 | 0.14 | 3.36 | 80 | −12 |
| Millenium | G5 | 293 | 0.34* | 22 | 100 | −1 |
|  | DT-51D | 88 | 0.32 | 1.56 | 100 | −17 |
| Haishunde | $TiO_2$** | 354 | 0.37 | 5.11 | 100 | −17 |

*obtained from another LOT of G5 with identical grade
**FCT010925

The obtained extrudates were crushed and sieved into 30-80 mesh fraction that is suited for catalytic testing in a tubular trickle flow reactor. After proper sulfidation using common refinery practice for hydrotreating catalysts, the activity in hydrodesulfurization was measured. A full range straight run ('virgin') gas oil was used as feed having a 1.63 wt % sulfur content. The test was performed at 1.75 $l.l^{-1}.h^{-1}$ liquid hourly space velocity with 55 bar hydrogen partial pressure. The activity is expressed as the difference in the required temperature to process the above mentioned feed to 10 ppmw sulfur in product, using the performance of a catalyst prepared by following Example 5 as a base case (i.e. providing the reference temperature of activity). These values are also presented in Table 5. Note that a larger absolute value of the negative numbers (a larger difference) translates into a more active catalyst compared to the reference.

From Table 5 it is clear that with titania powders having considerably different physical properties, it is still possible to achieve a significant increase in performance. Up to 17° C. improvement in activity can be associated to using various titania sources.

Based on the average particle size of the titania powders employed, the highest activity can be associated with particle sizes below 10 μm in the initial titania used.

Example 10

Comparison of Activity with Increasing Titania Content

Following the preparation route described in Example 5, three additional samples were prepared using refractory oxides with increasing proportions of titania. The catalytic performance was tested under identical conditions as described in Example 9. The obtained performance is expressed in terms of pseudo first order reaction rate constants in the HDS reaction in (Table 6). Note that a higher reaction rate constant indicates a more active catalyst.

TABLE 6

Refractory oxide, the percentage of titania in the refractory oxide and the relative temperature required to reach 10 ppmw sulfur in product

| Refractory oxide | Titania content as a percentage of the refractory oxide (wt %) | Pseudo first order reaction rate constant k(HDS) ($l·l^{-1}·h^{-1}·\%$ wt $S^{-1}$) |
|---|---|---|
| Silica[1] | 0 | 19.9 |
| Silica-titania[2] | 70 | 27.1 |
| Titania[3] | 100 | 37.2 |

[1] silica used is SIPERNAT 50
[2] silica-titania used is FTS 01 from Haishunde
[3] titania used is FCT010925 from Haishunde Table 6 clearly demonstrates that with increasing titania content in the refractory oxide, the performance of the catalysts is improved: higher pseudo reaction rate constant were obtained for the removal of sulfur.

Example 11

$NiO/MoO_3/WO_3/SiO_2$ 30.2 wt %/19.1 wt %/30.8 wt %/19.9 wt %

In a 5 litre autoclave 3088 g water were weighed and heated to 80° C. Upon reaching the temperature, 90.9 g silica (SIPERNAT 50), 240.8 g nickel carbonate (39 wt % Ni), 94.1 g ammonium heptamolybdate (81.63 wt % $MoO_3$), and 143.6 g ammonium metatungstate (86.11% $WO_3$) were added. All of the metal-containing components were added in powder form. Following the addition of 122.7 g ammonia solution (25 wt % ammonia content), the temperature was kept at 80° C. for 30 minutes, while the pH of the resulting slurry was 8.8 (measured at room temperature for a small test portion).

After 30 minutes the heating was switched off and the slurry was spray dried. In total, 407.7 g of solid material were collected. This powder was extruded directly, after which it was dried and calcined at 300° C.

Example 12

$NiO/MoO_3/WO_3/TiO_2$ 30.2 wt %/19.1 wt %/30.8 wt %/19.9 wt %

In a 5 litre bulb, 3094 g water were heated to 80° C. Subsequently 84.2 g titania, 240.8 g nickel carbonate (39 wt % Ni), 94.1 g ammonium dimolybdate (81.63 wt % $MoO_3$), 143.6 g ammonium metatunsgstate (86.11% $WO_3$)—all added in powder form—and 122.7 g ammonia solution (25 wt % ammonia) were added, while maintaining the temperature at 80° C. The pH of the slurry was 8.8.

After 30 minutes the heating was switched off, and the spray drying of the slurry began. The resulting powder was extruded, dried and calcined at 300° C.

Example 13

Comparison of HDS Activity of the Catalysts of Example 11 and Example 12

Gas oil HDS testing was performed in a nanoflow setup under trickle flow conditions, using full range ("virgin") straight run gas oil as feed. The catalysts was crushed and sieved into a 30-80 mesh size fraction. After drying, they were loaded into the reactors with SiC as diluent to ensure proper plug flow conditions. Prior to testing, the catalysts were sulfided with the feed itself, according to a standard refinery procedure.

Testing was performed at 345° C., under 55 bar hydrogen partial pressure, with hydrogen gas rate of 300 Nl/kg feed. No additional $H_2S$ was added to the recycle gas, while the liquid hourly space velocity (LHSV) was varied between 1.75 and 2.5 $l.l^{-1}.h^{-1}$ values.

The obtained product sulfur contents corrected to the target conditions, the pseudo first order reaction rate constants, and the calculated relative volumetric activity based on the performance of Example 11 is shown in Table 7.

TABLE 7

Actual sulfur in product, temperature required for 10 ppmw sulfur in product, and relative volumetric activities of catalysts tested in full range straight run ("virgin") gas oil hydrodesulfurization

|  | Example 11 Silica | | Example 12 titania | |
|---|---|---|---|---|
| Target LHSV ($l \cdot l^{-1} \cdot h^{-1}$) | 1.75 | 2.5 | 1.75 | 2.5 |
| Sulfur in product (ppmw) | 24 | 341 | 9 | 118 |
| Temperature required for 10 ppmw sulfur in product (° C.) | 359 | 408 | 344 | 387 |
| Relative Volumetric Activity (%) | 100 | 100 | 166 | 182 |

As it can be seen from Table 7, the catalyst of Example 12 achieved lower than 10 ppmw sulfur in product under the chosen test condition at 1.75 $l.l^{-1}.h^{-1}$ space velocity. This was not possible with the silica-containing counterpart (Example 11). Furthermore, the required temperatures for 10 ppmw sulfur in product are systematically lower for the titania sample with an activity gap of approximately 15° C. at both space velocities. This clearly demonstrates the benefit of using titania with the applied composition and preparation route.

Example 14

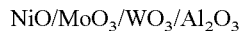

NiO/MoO$_3$/WO$_3$/Al$_2$O$_3$ 29.9 wt %/19.2 wt %/30.9 wt %/20.0 wt %

In this preparation, Example 7 from WO 00/41810 was reproduced with the addition of 20 wt % alumina as refractory oxide after the precipitation was complete.

Solution A: 52.95 g ammonium heptamolybdate (81.62 wt % MoO$_3$) was dissolved in 2400 ml water in a 5 litre bulb. In addition, 80.8 g ammonium metatungstate (86.11 wt % WO$_3$) were added and dissolved in the aqueous mixture. The mixture was then heated to 90° C.

Solution B: 135.5 g nickel carbonate (39 wt % Ni) were part-dissolved in 600 ml water and heated to 90° C.

Solution B was pumped into solution A over a 10 minute period of time with vigorous stirring. The resulting solution was kept at 90° C. with stirring for 20 hours. After this reaction period, 71.5 grams of Versal Alumina were added to the slurry. 30 minutes after the addition of the alumina, the heating was switched off and the slurry was spray-dried. 200.3 g solid material were collected in total. The powder was turned into the final shaped product by extrusion, drying, and calcination at 300° C.

Example 15

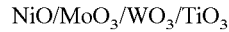

NiO/MoO$_3$/WO$_3$/TiO$_3$ 29.9 wt %/19.2 wt %/30.9 wt %/20.0 wt %

Example 14 Repeated with Use of Titania Instead of Alumina

In this preparation, Example 7 from WO 00/41810 was reproduced as in Example 14 with the modification of replacing the refractory oxide by 20 wt % titania.

Solution A: in a 5 litre bulb 52.95 g ammonium heptamolybdate (81.62 wt % MoO$_3$) was dissolved in 2400 ml water and then 80.8 g ammonium metatungstate (86.11 wt % WO$_3$) was added and dissolved. The mixture was heated to 90° C.

Solution B: 135.5 g nickel carbonate (39 wt % Ni) was slurried in 600 ml water and heated to 90° C.

Solution B was pumped in solution A over a 10 minute period of time with vigorous stirring. The resulting solution was kept at 90° C. while stirring for 20 hrs. After this reaction period, 47.3 grams of titania was added to the slurry and mixed thoroughly. 30 minutes later the heating was switched off, and the slurry was spray dried. In total, 189.0 g of solids were recovered. The powder was turned into the final shaped product by compaction, drying and calcination at 300° C.

Example 16

Comparison HDS Performance of the Catalysts of Example 14 and Example 15

Gas oil HDS testing was performed in a nanoflow setup under trickle flow conditions, using full range ("virgin") straight run gas oil as feed. The catalysts were crushed and sieved into a 30-80 mesh size fraction. After drying, they were loaded into the reactors with SiC as diluent to ensure proper plug flow conditions. Prior to testing, the catalysts were sulfided with the feed itself, according to a standard refinery procedure.

Testing was performed at 55 bar hydrogen partial pressure. An additional testing condition at 40 bar hydrogen pressure was also measured. The liquid hourly space velocity (LHSV) was set to 1.75 for both 55 bar and 40 bar conditions. The feed contained 1.6 wt % sulfur.

Test data with sulfur in product, the temperature required to process the feed to 10 ppmw sulfur, the pseudo first order reaction rate constants, and the relative volumetric activity based on the reaction rate constants are given in Table 8.

TABLE 8

Sulfur in product, temperature required for 10 ppmw product sulfur content, pseudo first order reaction rate constants and relative volumetric activities of catalysts in processing full range straight run ('virgin') gas oil

|  | Example 14 Alumina | | Example 15 titania | |
|---|---|---|---|---|
| Hydrogen partial pressure (bar) | 55 | 40 | 55 | 40 |
| Sulfur in product (ppmw) | 37 | 48 | 5 | 13 |
| Temperature required for 10 ppmw sulfur in product (° C.) | 340 | 354 | 310 | 334 |
| $k_{HDS}$ ($l \cdot l^{-1} \cdot h^{-1} \cdot \%$ wt S$^{-1}$) | 55.1 | 47.6 | 158.0 | 93.5 |
| Relative Volumetric Activity (%) | 100 | 100 | 287 | 197 |

It is clear from Table 8 that the use of titania in the catalyst composition has significantly improved the activity. The sulfur remaining in the product was lower at both pressures applied for hydrotreating. The temperatures required to process the feed to 10 ppmw sulfur product content is 30° C. lower at 55 bar hydrogen pressure for the titania-containing catalyst, and this advantage is only diminished to a 20° C. at 40 bar. When translated into relative volumetric activities, the titania counterpart is approximately twice as active as the alumina version at 40 bar (4 Mpa), and close to three times as active at 55 bar (5.5 Mpa) hydrogen partial pressures.

We claim:

1. A process for the preparation of a catalyst composition, wherein said process comprises: combining a Group VIb metal compound, a Group VIII metal compound, and a titania-containing refractory oxide material, wherein said titania-containing refractory oxide material comprises 50 wt % or more titania, on an oxide basis, and includes titania powder having an average particle diameter of 50 microns or less and a B.E.T. surface area in the range of from 10 to 700 m$^2$/g, in the presence of a protic liquid and an alkali compound; forming a coprecipitate; and recovering said coprecipitate which comprises a Group VIb metal component, a Group VIII metal component, and a refractory oxide material.

2. A process as claimed in claim 1, wherein at least one of the metal compounds used in the combining step is partly in solid state and partly in dissolved state.

3. A process as claimed in claim 2, which comprises heating a precursor composition which is in the form of, or is recovered from, a slurry, after aging at a temperature in the range of from 20 to 95 deg C for a minimum of 10 minutes, said slurry being obtained by coprecipitating, at a sufficient time and temperature, said Group VIb compound, said Group VIII compound, said titania-containing refractory oxide material, and said alkali compound, in a protic liquid.

4. A process as claimed in claim 3, wherein the titania used has a particle diameter of 10 microns or less.

5. A process as claimed in claim 4, wherein the coprecipitate is recovered by spray-drying.

6. A process as claimed in claim 5, wherein said alkali compound is ammonia or a component that will generate ammonium ions in the protic liquid used.

7. A process as claimed in claim 6, wherein said coprecipitate is further subjected to any one or more of the following process steps carried out in any appropriate order: cooling; optionally isolating; drying; shaping, preferably by extrusion using no extrusion aids; calcining; sulphiding.

8. A process as claimed in claim 1, wherein all metal compounds are added to the protic liquid as solids.

9. A catalyst composition as prepared by the process of claim 1, 2, 3, 4, 8, 5, 6, or 7, wherein said catalyst composition comprises:
    a Group VIb metal component present in the amount in the range of from 5 to 90 wt. %, as the oxide and based on the total coprecipitate;
    a Group VIII metal component present in the amount in the range of from 2 to 80 wt. %, as the oxide and based on the total coprecipitate; and
    a titania-containing refractory oxide material having present therein 50 wt. % or more titania, on an oxide basis, and includes titania powder having an average particle diameter of 50 microns or less and a B.E.T. surface area in the range of from 10 to 700 $m^2/g$.

10. A method of preparing a catalyst composition, said method comprises:
    combining a Group VIb metal compound, a Group VIII metal compound and a titania-containing refractory oxide material, which comprises titania powder having an average particle diameter of 20 microns or less, in the presence of a protic liquid;
    subjecting a mixture resulting from said combining step to coprecipitation conditions thereby forming a coprecipitate solid; and
    recovering said coprecipitate solid comprising at least 50 wt % titania, on an oxide basis.

11. A method as recited in claim 10, wherein at least one of the metal compounds combined in the presence of said protic liquid is partly in solid state and partly in dissolved state.

12. A method as recited in claim 11, wherein said recovering step includes:
    heating said coprecipitate solid at an elevated temperature so as to yield said composition.

13. A method as recited in claim 12, wherein said protic liquid comprises water, and further combined with said non-noble Group VIb metal compound, said non-noble Group VIII metal compound, and said titania-containing refractory oxide is an alkali compound.

14. A method as recited in claim 13, wherein said coprecipitation conditions include maintaining said mixture at a coprecipitation temperature in the range of from 25 to 95° C. for a period of time in the range of from 10 minutes to 2 hours.

15. A method as recited in claim 14, wherein said elevated temperature is in the range of from 100° C. to 600° C.

16. A method as recited in claim 15, wherein said alkali compound is ammonia or a material that will generate ammonium ions in the protic liquid of said mixture.

17. A method as recited in claim 16, wherein said titania powder used in said combining step has an average particle diameter of 10 microns or less.

18. A method as recited in claim 17, wherein said catalyst composition is recovered by spray drying.

* * * * *